United States Patent

[11] 3,599,303

| [72] | Inventor | Terry L. Sletten |
| | | Westland, Mich. |
| [21] | Appl. No. | 792,403 |
| [22] | Filed | Jan. 21, 1969 |
| [45] | Patented | Aug. 17, 1971 |
| [73] | Assignee | The Valeron Corporation |

[54] CUTTING TOOL INSERT
14 Claims, 12 Drawing Figs.

[52] U.S. Cl. .................................................. 29/95, 29/96
[51] Int. Cl. .................................................. B26d 1/00
[50] Field of Search ........................... 29/95, 96, 97, 98, 105

[56] References Cited
UNITED STATES PATENTS

| 500,834 | 7/1893 | Youngs | 29/96 |
| 730,362 | 6/1903 | Gersenhover | 29/95 |
| 1,050,702 | 1/1913 | Shouldire | 29/96 |
| 1,187,618 | 6/1916 | Gridley | 29/95 |
| 1,246,652 | 11/1917 | Petit | 29/95 |
| 1,276,081 | 8/1918 | Kuhn | 29/96 |
| 1,406,265 | 2/1922 | Lawson | 29/96 |
| 3,149,400 | 9/1964 | Breuning | 29/96 |

FOREIGN PATENTS

| 12,231 | 4/1906 | Great Britain | 29/96 |
| 588,555 | 2/1925 | France | 29/96 |
| 1,120,391 | 4/1956 | France | 29/96 |
| 129,453 | 6/1959 | U.S.S.R. | 29/95 |

*Primary Examiner*—Harrison L. Hinson
*Attorney*—Farley, Forster & Farley

ABSTRACT: A cutting tool insert formed from a cylindrical blank to include a cutting edge in an axial plane across at least one end thereof and having a chip control relief therebehind and extending relatively below the cutting edge plane to provide side clearance.

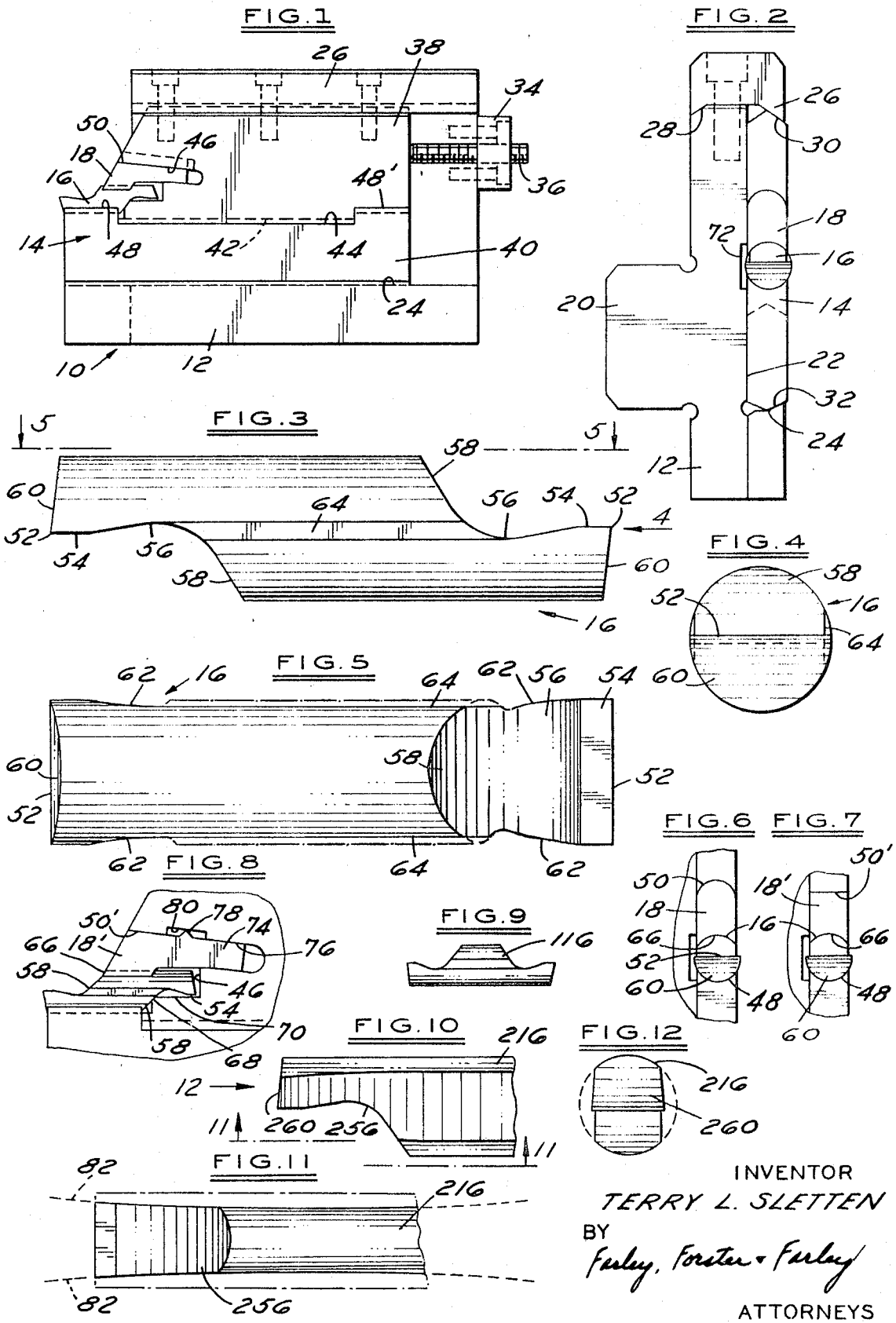

CUTTING TOOL INSERT

BACKGROUND OF THE INVENTION

Cutting elements used in cutoff tools are commonly known as formed of carbide, high-speed steel and cast alloys to include a side and back taper, behind the cutting edge, and with a relief tapering back under the cutting edge, for end clearance. They may be brazed on one or both ends of a holder shank, or be smaller one-piece elements with a cutting head at each end and a midsection of relatively reduced cross-sectional area; commonly known as a dog bone style.

Side clearance behind the cutting edge of a cutting element is most important in avoiding chip buildup that will interfere with the cutting proficiency of the tool. However, it is costly to provide the back, side and end taper, in combination, which affords this side clearance in cutting elements, as presently known.

Another problem involving cutting elements for cutoff tools, and for other tools which use like cutting elements, is in being able to hold them secure and still allow for replacement and indexing. The side taper reduces the seating area available and it is difficult to apply clamp pressure out over the ends of the cutting element without interference in the workpiece cut being made or possible fracture of the insert.

Most cutoff tool inserts have a V-shaped seating surface, fitting a complementary V-groove in a supporting blade, and a flat extending rearwardly from the cutting end for engagement by some form of overhanging and forwardly projecting clamp. However, there is also a wedge-type blade holder recently introduced which uses a semicylindrical insert and wedge clamp that has considerable promise. The seating surface for the insert is better and the wedge eliminates side clearance problems with respect to means for holding the insert on its seat.

SUMMARY OF THE INVENTION

The present invention relates to cutting tools that use replaceable cutting elements and in particular to an indexible cutting element, or insert, well suited for use in cutoff tools.

The cutting element is cylindrical in shape with ends that are more semicylindrical in form to provide cutting edges in an axial plane of the insert, on like or relatively opposite sides thereof. The cylindrical shape of the insert on its underside assures good seating surface contact and axial alignment on a supporting blade with a receptive groove and also affords natural taper on the sides of the insert below the cutting edges. The cylindrical and solid form of the insert at its midsection, enables good solid clamping or wedge pressure to be applied to retain the insert on its seat, without foreseeable damage due to fractures or injury to the reserve cutting edge.

An axial taper is provided back behind the cutting edges, dropping below the axial plane of the cutting edges, to afford natural back taper and consequently side clearance, due to the cylindrical form of the insert. This also provides a chip groove behind the cutting edge and by continuing the groove wall up to the top of the insert a chip-curling wall is obtained without any obstructions and, most notably, with the superior wear characteristics of the insert material.

The chip-curling wall also serves, at the reserve end of the cutting element, as a stop and shoulder wall that will locate the axial position of the insert on a holder blade and prevent rolling to assure the square cutting disposition of the cutting edge while in service.

The present invention is best and most broadly characterized as a cutting tool insert comprising a cylindrical blank formed to include a cutting edge in an axial plane across at least one end thereof and having a chip control relief therebehind extending relatively below the cutting edge plane to provide side clearance.

DESCRIPTION OF THE DRAWINGS

FIG. 1 is a side elevation of a cutoff tool including a two-piece blade and using a cylindrical insert in accord with the teachings of this invention.

FIG. 2 is an end view of the cutoff tool shown in the first drawing figure.

FIG. 3 is an enlarged side elevational view of the insert.

FIG. 4 is an end view of the insert.

FIG. 5 is a plan view of the insert showing the sidewalls relieved, in phantom outline.

FIG. 6 is a fragmentary end view of the blade holder with its wedge and insert in place.

FIG. 7 is similar to the last-mentioned drawing figure with a different type of wedge.

FIG. 8 is a fragmentary side elevational section showing the wedge and insert of FIG. 7.

FIG. 9 is a side elevation of another form of cylindrical insert.

FIG. 10 is a fragmentary side elevation of the end of still another form of cylindrical insert.

FIG. 11 is a top plan view of the insert shown in FIG. 10 with phantom lines showing the side relief provided.

FIG. 12 is an end view of the insert of FIGS. 10 and 11.

DETAILED DESCRIPTION OF THE INVENTION

The cutting tool 10 shown in the drawing is the type used for cutoff purposes. It includes a holder 12 for a blade 14 which has a cutting insert 16 held by a wedge 18 in its forwardly disposed edge.

The holder 12 is essentially rectangular in shape with a protrusion 20 on its back side, by means of which it may be held on edge is a supporting fixture (not shown), and with a flat sidewall face 22 against which the insert blade 14 is retained with the end of the blade, which includes the insert, extending beyond the holder part. A supporting ledge 24 is provided on the lower side face edge of the holder and extends its full length to receive and locate the blade 14 square on the holder in cooperation with a clamp 26 on top of the holder.

The clamp 26 includes overhanging side edges with inwardly chamfered lips 28 and 30 that cooperate with like chamfers on the upper back edge of the holder and upper front edge of the blade 14 to hold the blade against the registering sidewall 22 of the holder and on the supporting ledge 24. A similarly chamfered lip 32 on the outer edge of the blade supporting ledge 24, and on the lower outer edge of the blade, serve to further assure the secure engagement and retention of the insert blade on the holder without other fastener means.

A lug 34 on the back edge of the holder 12 extends out past the blade seating wall 22 and is drilled and tapped for an adjustment screw 36 by means of which the insert blade may be adjusted forwardly on the holder, when the clamp 26 is loosened.

Although the clamp-type holder 12 is particularly well suited for the insert blade 14 shown, other types of holders may be used with like blades or one-piece blades with the features of improvement hereinafter described.

The insert blade 14 is a two-piece blade with parts 38 and 40 that are formed to include an interfitting offset shoulder 42 and recess 44, with a V-groove and edge therebetween, by means of which they may be relatively aligned and the one part 40 may be turned end for end, should the end of such part, under the insert 16, become damaged. The blade part 38 is tapered rearwardly at its front edge, over the blade part 40, and is formed to include an opening 46, at its lower front corner, within which is received the cutting insert 16 and its wedge 18.

The blade part 40 is formed to include a supporting ledge and seat 48 for the insert and the wedge 18 serves to retain the insert securely on the ledge seat for cutting purposes.

The advantage of the two-piece blade construction shown is that the insert ledge seat 48 may be renewed, should it become damaged, by turning the blade part 40 end for end since a like ledge seat 48' is provided at its opposite end. And, the separate blade part 38 makes it possible to have the insert and wedge opening 46 formed in only one end thereof.

Since cutoff depths are seldom more than an inch or and inch and a half, there is ample support in the holder for the two-piece-type blade. However, the present invention is inclusive of both two-piece and one-piece insert blades, and should greater extensions and/or thinner blades dictate the need for a more solid one-piece blade, this course may be followed. The one-piece blade may still be reversible, to renew the insert seat, by having a like opening and blade end configuration on its back edge.

Referring now to the insert and wedge opening 46 in the blade, without distinction between one- and two-piece blades, it will be appreciated as being essentially a pie-shaped slot with inwardly converging side edges 48 and 50; with the side edge 48 providing a seat for the cutting insert 16 and the slot edge 50 serving as a reactionary wall for ramping the wedge 18 down into retaining engagement with the insert to hold it securely on the ledge seat 48.

Referring now to the cutting insert 16, it is shown best in FIGS. 3—5 as being cylindrical in shape and as having a cutting edge 52 in an axial plane of the insert at each end. Behind the cutting edges is a small land 54 and a chip groove relief 56 that is continued to provide a chip-curling wall 58 thereover and behind. The cutting edges 52 and their relief therebehind, on relatively opposite ends of the insert, are on relatively opposite sides of the insert, for reasons later described, so that the insert is indexed by being turned end for end and over.

End clearance 60 is provided under the cutting edges 52, at each end of the insert, and it will be appreciated that the formation of the chip groove relief 56 from the axial plane which includes the cutting edges and into the half-round portion relatively below such plane of reference, will provide tapered side clearance 62 from the cutting edge rearwardly. This side clearance may be extended further rearwardly, and between the chip groove reliefs at opposite end of an insert, by wiping the sides of a soft carbide insert, in the course of making it, or otherwise to provide the side flats 64 best shown in FIG. 3. This is also apparent behind, and both over and below, the cutting edge 52 in the FIG. 4 view of the insert.

The supporting ledge 48 of the blade 14 has a cylindrical concavity with complements of the shape of the insert and assures both good seating engagement for the insert and relative alignment of the insert on the seating ledge and with respect to the blade which carries it. The wedge 18, over the insert 16, similarly has an insert-engaging edge 66 formed with an insert complementing cylindrical concavity. The other edge of the wedge, that engages the slot wall 50, may have a cylindrical shape which matches a cylindrical concavity in the slot wall, as shown in FIGS. 2 and 6, or may be flat as shown in FIGS. 7 and 8, and identified as 50 '. In both instances the wedge 18 will center itself on the insert and relatively in the blade.

In FIG. 8 the insert 16 is shown as having back wall engagement against a shoulder 68, provided at the end of its seating groove, and which is disposed to register against the chip-curling wall 58 on the insert, at its other end. This fixes the axial location of the insert in the blade, locates the insert in the blade with its cutting edge square, and prevents the insert from rolling its seating groove.

It will be appreciated that a like shoulder stop could be disposed to engage the extreme end of the insert and to serve a like purpose. It might still be at the end of the insert seating groove, with a hat-shaped insert like that shown in FIG. 9, or it might be provided from relatively over the insert, either from the back wall or on an insert clamp having no appreciable rearward relative movement when applied.

The cutting edge of the insert that is disposed for cutting use may also be held square, and the insert kept rolling, by having its reserve cutting ledge land 54 seat on the back wall ledge 70 that extends forward to provide the back wall shoulder stop. However, the problems of close tolerance dimensioning to accomplish this and the chance of damage to the reserve cutting edge are best avoided by the arrangement shown.

In passing, it will be noted that the blade holder 12 has a small recess 72 formed in its sidewall face 22 from its front edge rearwardly in the vicinity of the insert 16 to accommodate the slightly wider dimension of the reserve cutting edge as compared to the blade thickness.

The wedge 18 is shown in the different drawing figures as having its inner end relieved, on its insert-engaging edge, to provide a tail 74 and more of a wedge foot for applying wedge pressure to the insert at its midsection. The tail on the insert wedge has its relatively opposite edges parallel to each other and is received in an extension 76 of the wedge and insert slot 46, with like parallel walls, to guide the wedge as it is placed in service and assure that the wedge-clamping foot or edge 66 applies a like uniform pressure along the full length of its area of engagement with the insert. The wedge foot assures that the wedge pressure will be at the strong midsection of the insert and not over its reserve end.

An optional feature for the wedge 18 is shown in FIG. 8, by means of which it may be relatively retained in a one-piece blade when changing or indexing an insert. This includes a shoulder stop portion 78 and cooperating recess 80 between the reactionary edge wall 50' of the wedge slot opening and the next adjacent edge of the wedge. The wedge may be loosened but will not pull out with the insert. However, it is easily inserted and removed sideways with respect to the wedge slot.

FIG. 9 shows an insert 116 that has its opposite ends formed as mirror images and is somewhat hat shaped in its side elevational view. However, it is formed from a cylindrical blank, like the other insert and has most of the important attributes of the other insert. A modified wedge form for retention in the blade may be used with this insert, or, as even with the other insert, a different type of insert clamp may be sued and applications for this and the other form of insert in milling, boring and other cutting tools are numerous.

FIGS. 10—12 show just one end of a cutting insert 216, which may have like or relatively reversed cutting ends and which avoid the problems of an appreciably reduced cross section behind the cutting edge, when small-sized inserts would be advisable, while still preserving the major features of the insert described.

A oversized cylindrical blank is used to make the insert 216 and relatively opposite sides are ground, cut or otherwise formed on like arcs 82 so that there is side relief behind the cutting edge. The cylindrical form of the insert is still evident on its top and bottom edges so that blade and wedge seating advantages are still present. Similarly, when the chip relief groove 256 is formed, it rakes back into the side clearance and when the end clearance 260 is provided there is tapered back under the cutting edge.

With each of the inserts 16, 116, and 216, it will be appreciated that no chip breaker is needed since the inserts have a chip breaker wall formed integrally over their cutting edges and behind their chip relief grooves. No appreciable chip wear will be experienced since there is no break in the chip-curling wall, as when separate chip breakers are used, and the cutting grade of the insert assures the best in wear resistance. It follows also that the insert-retaining wedge will not be subject to chip-breaking pressures since it no longer serves such a purpose.

The inserts shown and described, and like inserts embodying the teachings that have been set forth, may be used in other types of cutting tools, as previously mentioned, and may either be preformed in soft carbide, to the shape specified, or from cylindrical blanks which are standards in the field. They are structurally sound and securely retained, to assure good seating characteristics and long cutting life, and are both indexible and readily renewed, in cutoff or other tools, as and when necessary.

I claim:

1. A cutoff tool insert, comprising:

a cylindrical blank formed to include a transversely extending cutting edge in an axial plane across at least one end thereof and having a chip control relief therebehind and extending relatively below the cutting edge plane to provide side clearance.

2. The insert of claim 1, including;
a like cutting edge and chip control relief provided at each end of said blank.

3. The insert of claim 2,
the cutting edge and chip control relief at opposite ends of said blank being on relatively opposite sides of a common axial plane through said blank.

4. The insert of claim 1,
said chip control relief extending from relatively below the axial plane of the cutting edge to substantially thereover for providing a chip curling and wear-resistant surface spaced rearwardly of the cutting edge.

5. The insert of claim 4, including;
a like cutting edge and chip control relief provided at each end of said blank and with a cylindrical midsection relatively between the chip-wear-resistant surfaces at each end thereof for applying insert-seating pressure therebetween.

6. The insert of claim 5,
said chip-wear-resistant surfaces being formed to provide axial and radial locating shoulders for relatively opposite of said cutting edges.

7. The insert of claim 1, including;
a flat provided along the sides of said blank from relatively behind said cutting edge for extending said side clearance rearwardly of said chip control relief.

8. The insert of claim 2, including;
sidewall relief on said blank between said chip control reliefs for continuance of side clearance provided thereby.

9. The insert of claim 2, including;
a land next adjacent said cutting edges formed to provide a locating surface for relatively opposite of said cutting edges.

10. A cutting tool insert, comprising;
a cylindrical member having a cutting edge provided on an axial plane across at least one end thereof and with rearwardly tapering side clearance provided therebehind.

11. The cutting tool insert of claim 10,
said side clearance being provided by a chip control relief at an axial rake angle behind said cutting edge and within the semicylindrical section of said member relatively therebelow.

12. The insert of claim 1 including holding means engaging said insert, said holding means having a slot with an insert seat engaging said insert, an insert-retaining wedge engaging said slot and said insert for holding said insert on said seat, the improvement, comprising; insert-engaging wedge and wedge slot surfaces complementing the cylindrical shape of said insert for relatively orienting and seating the insert in said slot and guiding said wedge in the application of insert-retaining wedge pressure thereagainst.

13. The cutting tool of claim 12;
said wedge and its slot wall being formed to fix the radial disposition of said wedge in applying retaining wedge pressure against the cylindrical insert.

14. The cutting tool of claim 13, including
an extension of said wedge and wedge slot having complementary and relatively parallel spaced edge walls for keeping said wedge and its slot wall relatively engaged and aligned in the course of wedge use.